(12) United States Patent
Takasu et al.

(10) Patent No.: US 12,437,334 B2
(45) Date of Patent: Oct. 7, 2025

(54) MANAGEMENT SYSTEM

(71) Applicant: HONDA MOTOR CO., LTD., Tokyo (JP)

(72) Inventors: Kojiro Takasu, Tokyo (JP); Shigeki Edamatsu, Wako (JP); Hirotaka Endo, Wako (JP); Yuka Kuramochi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 274 days.

(21) Appl. No.: 18/255,912

(22) PCT Filed: Dec. 7, 2020

(86) PCT No.: PCT/JP2020/045498
§ 371 (c)(1),
(2) Date: Jun. 5, 2023

(87) PCT Pub. No.: WO2022/123634
PCT Pub. Date: Jun. 16, 2022

(65) Prior Publication Data
US 2024/0037644 A1 Feb. 1, 2024

(51) Int. Cl.
*G06Q 30/0645* (2023.01)
(52) U.S. Cl.
CPC ................ *G06Q 30/0645* (2013.01)
(58) Field of Classification Search
None
See application file for complete search history.

(56) References Cited

U.S. PATENT DOCUMENTS

| | | | |
|---|---|---|---|
| 6,177,879 B1* | 1/2001 | Kokubu | B62M 6/90 340/432 |
| 2009/0138383 A1* | 5/2009 | Alba | G06Q 20/20 705/28 |

(Continued)

FOREIGN PATENT DOCUMENTS

| | | |
|---|---|---|
| JP | 2002-216855 A | 8/2002 |
| JP | 2002-216857 A | 8/2002 |

(Continued)

OTHER PUBLICATIONS

How contractors can profit from Idle Equipment, 2017 (Year: 2017).*

(Continued)

*Primary Examiner* — Dennis W Ruhl
(74) *Attorney, Agent, or Firm* — Rankin, Hill & Clark LLP

(57) ABSTRACT

A management system includes a management server that can communicate information with a battery station that houses a battery that is lent based on a usage agreement. The management server acquires the lending date and time at which the battery is lent from the battery station, and the return date and time at which the battery is returned to the battery station during the usage agreement period of an existing contract user. When a prescribed period has elapsed from the lending date and time without the battery being returned, or when a prescribed period has elapsed from the return date and time without the battery being lent, the management server determines that the battery is in an idle state.

7 Claims, 8 Drawing Sheets

(56) References Cited

U.S. PATENT DOCUMENTS

| | | | |
|---|---|---|---|
| 2014/0368156 A1* | 12/2014 | Aloe | G06Q 30/0641 |
| | | | 320/106 |
| 2016/0099590 A1* | 4/2016 | Velderman | G07F 7/06 |
| | | | 320/113 |
| 2016/0210688 A1* | 7/2016 | Stannard | G06Q 10/06315 |
| 2016/0283999 A1* | 9/2016 | Toya | G01C 21/3679 |
| 2017/0061709 A1 | 3/2017 | Toya | |
| 2017/0063111 A1 | 3/2017 | Toya et al. | |
| 2022/0198466 A1* | 6/2022 | Maruyama | G06Q 30/06 |

FOREIGN PATENT DOCUMENTS

| | | |
|---|---|---|
| JP | 2004-265394 A | 9/2004 |
| JP | 2008-250786 A | 10/2008 |
| JP | 2013-205873 A | 10/2013 |
| JP | 2017-045449 A | 3/2017 |
| JP | 2017-045720 A | 3/2017 |
| JP | 2019-086716 A | 6/2019 |

OTHER PUBLICATIONS

International Search Report, International Application No. PCT/JP2020/045498, Date of mailing: Jan. 12, 2021, 2 pages.
Japanese Office Action dated Dec. 19, 2023, Japanese Application No. JP 2022-567908, English translation included, 7 pages.

\* cited by examiner

USER ID TO WHICH BATTERY IS RENTED

| BATTERY ID | BATTERY STATION | RENTAL STATE | RENTAL DATE AND TIME | RETURN DATE AND TIME | | USAGE CONTRACT PERIOD FOR USER |
|---|---|---|---|---|---|---|
| MPP001 | S001 | RENTED OUT | 20/01/07 8:00 | - | 00001 | 20/01/01~20/01/15 |
| MPP002 | S001 | RENTED OUT | 20/01/04 8:00 | - | 00001 | 20/01/01~20/01/15 |
| MPP003 | S002 | RENTED OUT | 19/12/28 9:30 | 19/12/30 19:00 | 01234 | 19/12/25~20/01/31 |
| MPP004 | S001 | NOT RENTED | - | 19/12/30 19:00 | 05678 | 19/12/01~20/01/20 |
| MPP005 | S001 | NOT RENTED | - | 20/01/04 17:00 | 00001 | 20/01/01~20/01/15 |
| ... | ... | ... | ... | ... | ... | ... |

FIG. 5B

USER ID: 00001

| BATTERY ID | RENTAL STATE | CURRENT ELAPSED PERIOD OF TIME (Nr, Ns) | PAST RECORD OF PERIOD FOR RENTED STATE (Pr) | PAST RECORD OF PERIOD FOR NOT-RENTED STATE (Ps) | IDLE DETERMINATION RESULT (J) | EARLY TERMINATION DETERMINATION RESULT (E) |
|---|---|---|---|---|---|---|
| MPP001 | RENTED OUT | 0 DAYS | 1 DAY | 1 DAY | - | - |
| MPP002 | RENTED OUT | +2 DAYS | 1 DAY | 1 DAY | IDLE (RENTED) | EARLY TERMINATION TARGET |
| MPP005 | NOT RENTED | +2 DAYS | 1 DAY | 1 DAY | IDLE (NOT RENTED) | EARLY TERMINATION TARGET |

70

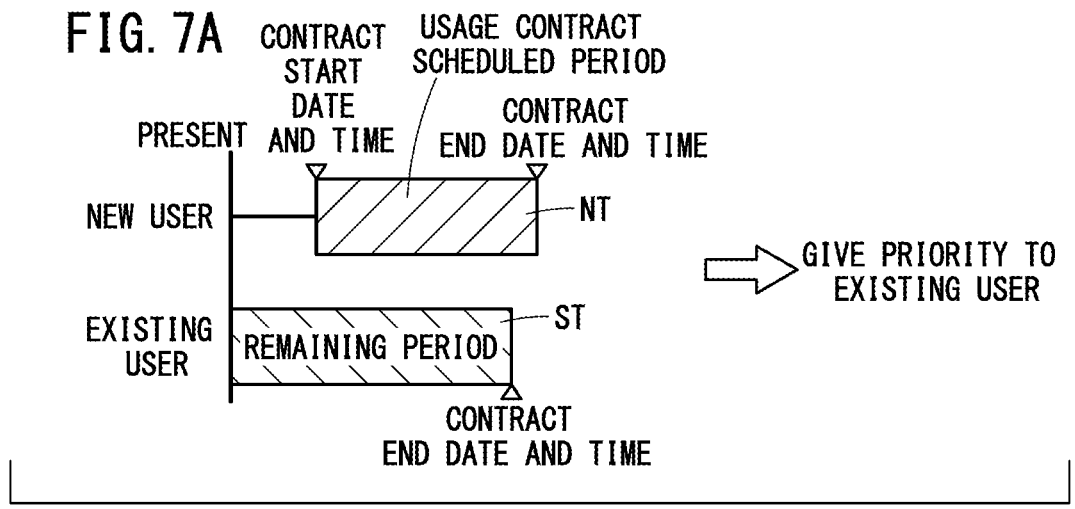
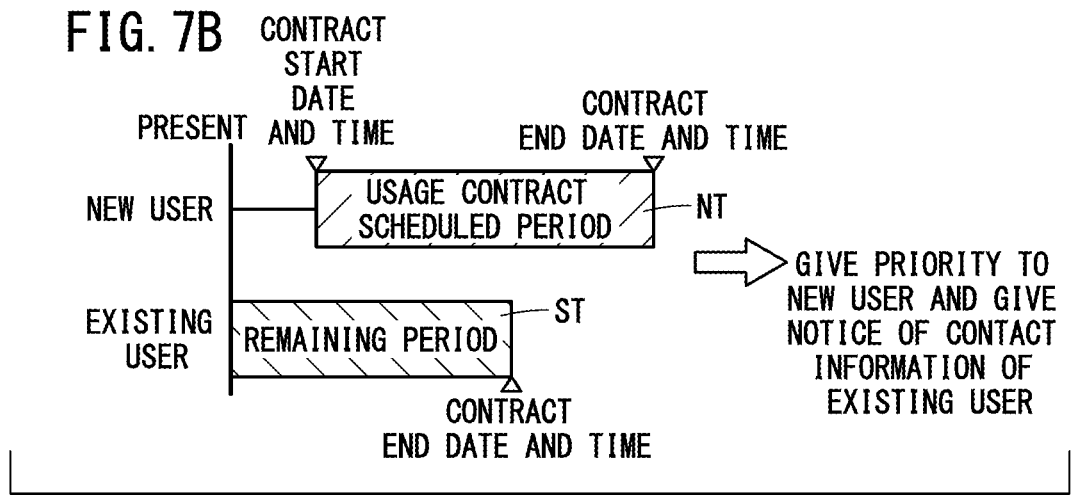
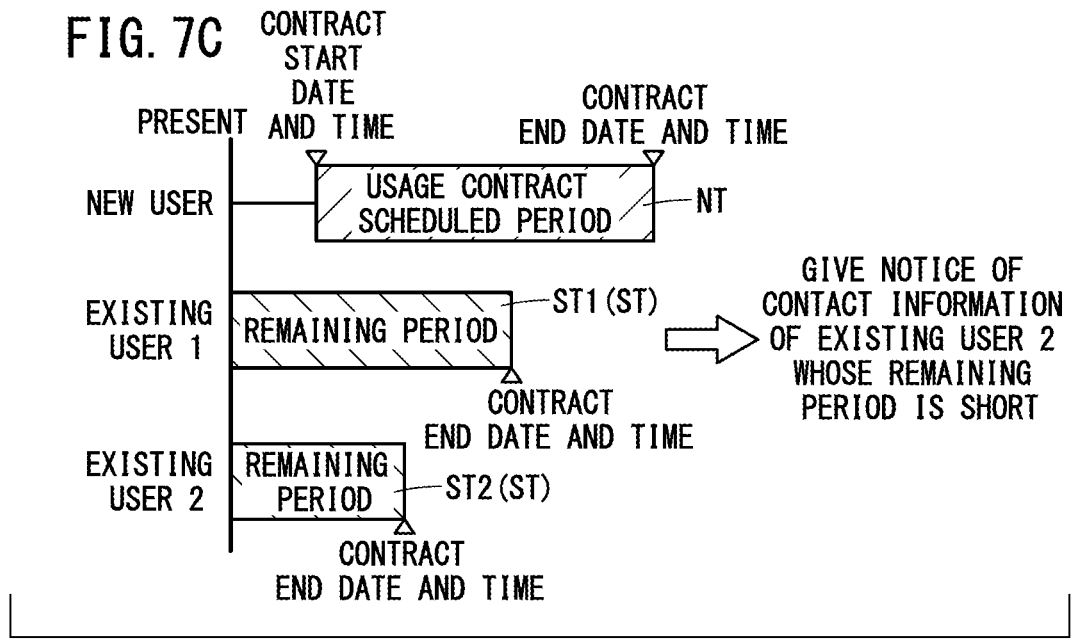

MANAGEMENT SYSTEM

TECHNICAL FIELD

The present invention relates to a management system for managing a battery attachable to and detachable from a device.

BACKGROUND ART

In recent years, there has been provided a system (sharing system, rental system) for renting, to a user, a battery, which is attachable to and detachable from a device such as an electric work machine or an electric vehicle. For example, JP 2017-045449 A discloses a system in which a power storage device (battery) for supplying electric power to an electric bicycle or the like is rented to a user. In addition, in a system disclosed in JP 2017-045449 A, history information (total discharge amount, total charge amount, number of times of charging, number of times of discharging, and the like) of a power storage device is transmitted to a server device via an information terminal of a user, and a state of the rented power storage device is managed in the server device.

SUMMARY OF THE INVENTION

In the above-described system, there is a possibility that the battery rented to the user is left unused (in an idle state), depending on circumstances. Even during the usage contract period defined in the battery usage contract, if the battery is left idle, the battery cannot be rented to another user who wants to use the battery next time. In other words, for all users of the system, rental of the battery is operated inefficiently.

The present invention has been made in view of the above circumstances, and an object thereof is to provide a management system capable of operating a battery rental more efficiently.

In order to achieve the above object, according to an aspect of the present invention, there is provided a management system including a management server configured to perform information communication with an accommodation device configured to accommodate a battery to be rented based on a usage contract, wherein the management server is configured to: acquire a rental date and time at which the battery was rented from the accommodation device and a return date and time at which the battery was returned to the accommodation device, during a usage contract period of an existing user who has made the usage contract for use of the battery; and determine that the battery is in an idle state in a case that a predetermined time period has elapsed since the rental date and time without the battery being returned or in a case that a predetermined time period has elapsed since the return date and time without the battery being rented.

The management system described above can operate the battery rental more efficiently.

BRIEF DESCRIPTION OF DRAWINGS

FIG. 5A is a table illustrating a battery database;

FIG. 5B is a table illustrating per-user information;

FIG. 7A is an explanatory diagram showing an example of processing for comparing the remaining period of an existing user with the usage contract scheduled period of a new user;

FIG. 7B is an explanatory diagram showing an example of processing for comparing the remaining period of the existing user with the usage contract scheduled period of a new user;

FIG. 7C is an explanatory diagram showing an example of processing for comparing the remaining period of the existing user with the usage contract scheduled period of a new user.

DETAILED DESCRIPTION OF THE INVENTION

A preferred embodiment of the present invention will be presented and described in detail below with reference to the accompanying drawings.

Figure 1:
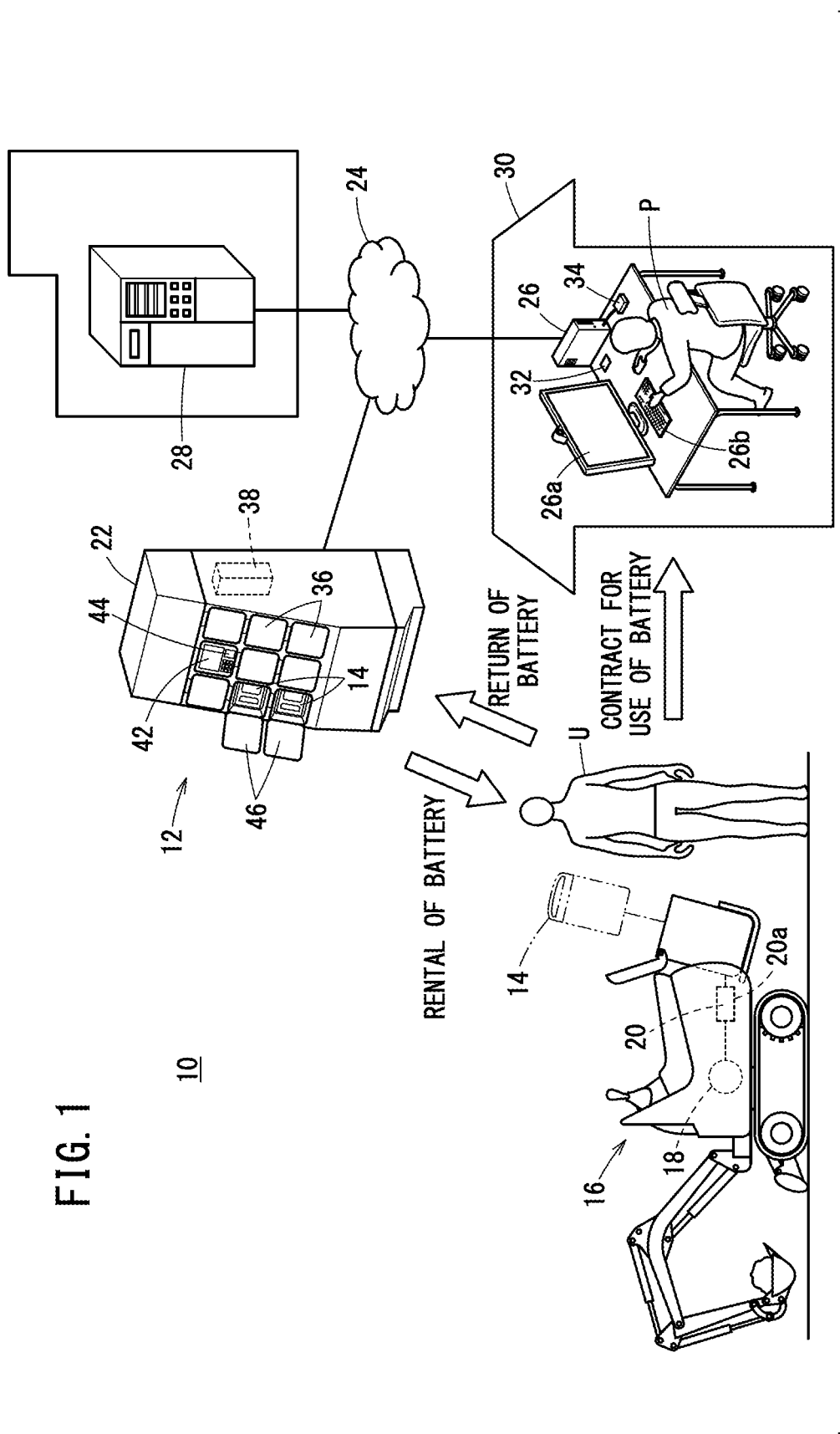
FIG. 1 is an explanatory diagram showing an overall configuration of a management system according to an embodiment of the present invention.

As shown in FIG. 1, a management system 10 according to an embodiment of the present invention is applied to a sharing system 12 that rents (lease or rental) a battery 14 from a business operator to a plurality of users U. A user U who rents the battery 14 in the sharing system 12 mounts the battery 14 on a device 16 and uses the device 16 based on power supply by the battery 14. The "user U" of the sharing system 12 refers to one individual and also refers to an organization (company, group, or the like) of a plurality of persons. In addition, the sharing system 12 is not limited to a form in which the business operator rents the battery 14 to the user U, and may be a form in which one or more batteries 14 are shared among a plurality of the users U.

The battery 14 rented to the user U is a general-purpose detachable battery that is detachably mounted on various devices 16. The device 16 of the user U may be owned by the user U or may be rented separately from the battery 14. Examples of the device 16 include a work machine (for example, a construction machine, a heavy machine, an industrial device, and a household device) and a mobile body (for example, a four-wheeled vehicle, a two-wheeled vehicle, an electric bicycle, a cart, and a robot). In FIG. 1, an electric excavator operated by power supply of the battery 14 is representatively illustrated as the device 16. The device 16 includes a drive source 18 such as a motor, an electrical component 20 including a control device 20a, and the like. The device 16 operates when electric power is supplied from the mounted battery 14 to the drive source 18 or the electrical component 20. The device 16 may be configured to include a battery unit (not shown) for driving the electrical component 20 with low power when the battery 14 is not mounted.

In order to facilitate understanding of the present invention, a procedure of using the sharing system 12 according to the present embodiment will be described with reference to FIG. 2.

In using the sharing system 12, the user U first makes a contract for using the battery 14 with the business operator of the sharing system 12 (step S1). During the usage period according to the usage contract, the user U goes to an appropriate battery station 22 (accommodation device: see FIG. 1) and rents the battery 14 from the battery station (step S2).

Then, the user U mounts the rented battery 14 on the device 16 and uses the device 16 (step S3). When the remaining battery level of the battery 14 becomes low during the usage contact period, the user U puts the battery 14 into the battery station 22 from which the battery 14 is received or into a battery station 22 different from the battery station 22 from which the battery 14 is received. Thus, the battery station 22 charges the accommodated battery 14. When the user wishes to continuously use the battery 14, the user U newly rents a charged battery 14 from the battery station 22.

When terminating the use of the battery 14, the user U returns the battery 14 to the battery station 22 and further performs a usage termination procedure to terminate the usage contract (step S4).

In order to implement the above-described usage procedure, the sharing system 12 is constructed as a client-server type using a network 24 such as the Internet or an intranet at the business operator of the system, as shown in FIG. 1. The sharing system 12 is configured to be connected to the network 24, and includes a business operator terminal 26, a management server 28, and the above-described battery station 22. Alternatively, the battery 14 itself may have a wireless communication function capable of being connected to the network 24, and may communicate with the management server 28 during use by the user U or during standby at the battery station 22.

The business operator of the sharing system 12 includes a business operator facility 30 that the user U visits when making a contract to use the battery 14. In the business operator facility 30, a business operator terminal 26 operated by a person in charge P is installed. For example, a computer (a desktop computer or a laptop computer) capable of communicating via the network 24 is applied as the business operator terminal 26. The business operator terminal 26 includes an output device 26a such as a monitor and a speaker and an input device 26b such as a keyboard and a mouse. Alternatively, an information processing terminal such as a PDA, a tablet, a smartphone, a mobile phone, or a wearable computer may be applied as the business operator terminal 26. In addition, the business operator may carry the business operator terminal 26 to perform business, and does not necessarily need to include the business operator facility 30.

The business operator gives user identification information (hereinafter, referred to as a user ID) to the user U who has made the usage contract. The user ID is set, for example, by designation by the user U or automatic assignment by the business operator side, and is transmitted to the management server 28 via the business operator terminal 26, whereby the use ID is managed by the business operator terminal 26 and the management server 28. The business operator facility 30 includes an IC card 32 having a RF tag built-in and a writer 34 connected to the business operator terminal 26 for writing information in the IC card 32. The business operator issues the IC card 32 storing information including the user ID to the user U who has made the usage contract.

The battery station 22 is an accommodating device formed in a shelf shape in which slots 36 capable of accommodating a plurality of batteries 14 are arranged in a matrix, and is installed, for example, outside the business operator facility 30. The battery station 22 has a function as a charger that charges the battery 14 when the battery 14 is put into the battery station by the user U or the person in charge P on the business operator side, and a function as an exchanger that exchanges the battery 14 with another battery 14. It is more preferable that the battery stations 22 be installed at various places in town. For example, the battery station 22 may be temporarily installed at a place (work site) where a user or the like works using the device 16.

The battery station 22 includes a computer (rental control unit 38) including one or more processors, a memory, and an input/output interface (not shown), and is configured to be able to communicate with the management server 28. There are provided, outside the battery station 22, a touch panel 42 (display operation unit) or another operation unit that displays an image under the control of the rental control unit 38 and recognizes and receives an image operation performed by the user U, and a reader 44 (input unit) that reads information from the IC card 32 of the user U. Furthermore, each of the slots 36 of the battery station 22 includes a communication module (not shown) that perform information communication with the accommodated battery 14, and a battery lock mechanism 46 that switches between a removal permission state and a removal prohibition state of the battery 14.

The rental control unit 38 of the battery station 22 acquires information such as battery identification information (hereinafter referred to as battery ID) and the remaining battery level of the battery 14 from the accommodated battery 14 via the communication module, and automatically transmits the acquired information to the management server 28. In addition, the rental control unit 38 processes the operation of the touch panel 42 performed by the user U and the information of the IC card 32 acquired by the reader 44, and performs information communication with the management server 28 to appropriately manage the battery 14 to be rented to the user U.

Hereinafter, the configuration of the sharing system 12 according to the present embodiment will be described in more detail in accordance with the usage procedure of FIG. 2. As step S1 in FIG. 2, the user U who desires to use the sharing system 12 goes to the business operator facility 30 and makes a contract for using the battery 14 with the business operator.

Figure 3:
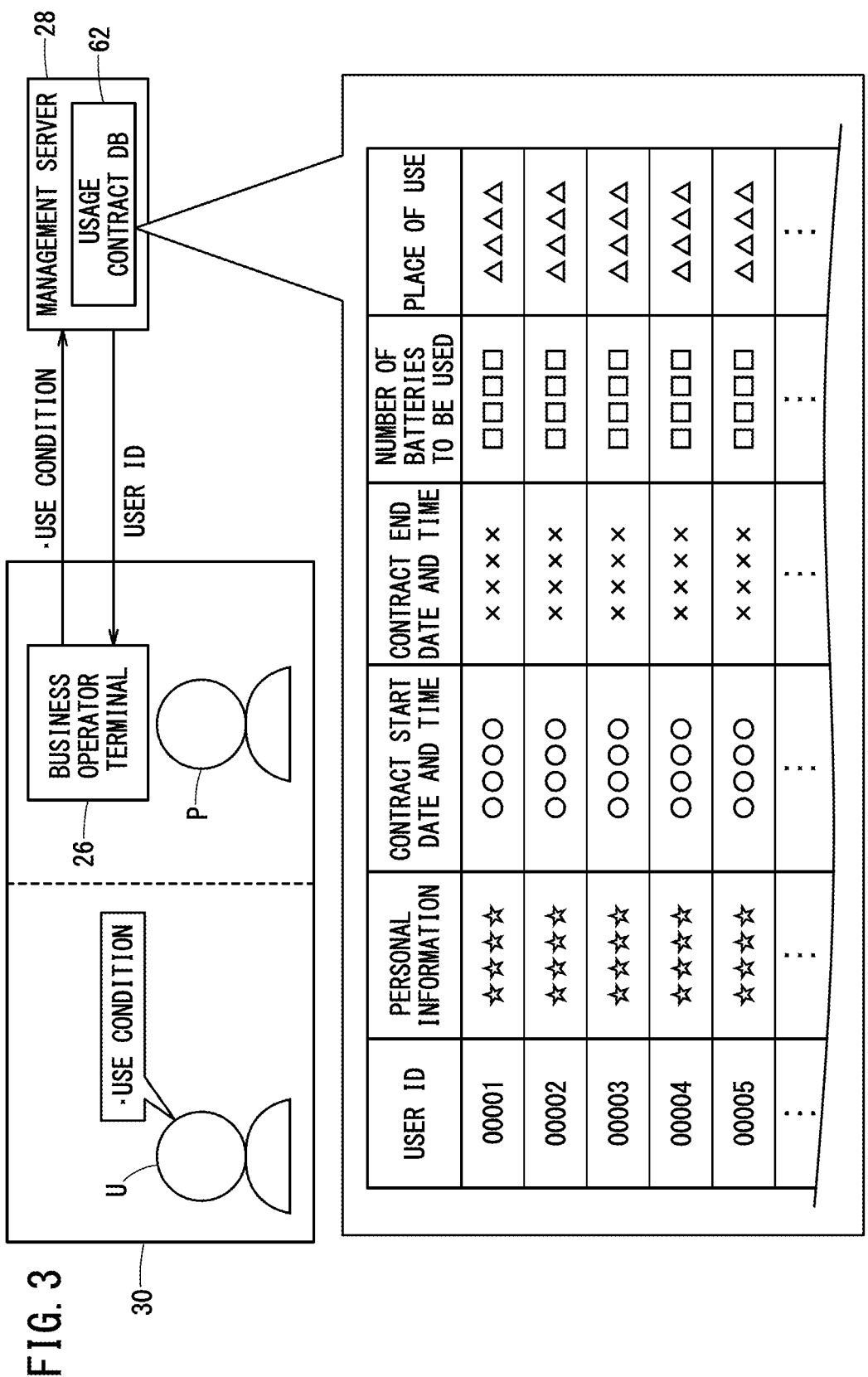
FIG. 3 is an explanatory diagram showing a flow at the time of contract for use of a battery and a usage contract database.

As shown in FIG. 3, in the usage contract of the battery 14, the user U who has visited the business operator facility 30 gives the use condition of the battery 14 to a person in charge P of the business operator facility 30 to make the usage contract. Examples of the use condition include personal information of the user U (for example, a name, an address, contact information (a telephone number, and a mail address)), a date and time for starting the contract (contract start date and time), a date and time for ending the contract (contract end date and time), the number of batteries to be used, a place of use, and the like. Note that the "date and time" in the present specification may be information including a date and a time, or may be information including only a date. Accordingly, the user U may designate only the date when conveying the use condition.

The person in charge P inputs the use condition to the business operator terminal 26, accesses the management server 28 via the business operator terminal 26, and sets the user ID unique to the user U. When the user ID is already set by having already used the sharing system 12, the person in charge P reads the user ID and inputs the use condition in association with the user ID. The user ID and the use condition input to the business operator terminal 26 are transmitted to the management server 28 and managed by the business operator terminal 26 and the management server 28.

The management server 28 holds a usage contract database 62 (which will be hereinafter referred to as a usage contract DB 62) in advance. The management server 28 registers the user ID and the use condition into the usage contract DB 62 when the user ID and the use condition are transmitted from the business operator terminal 26. The usage contract DB 62 stores the user ID, the personal information, the contract start date and time, the contract end date and time, the number of batteries to be used, the place of use, and the like, in association with one another. The management server 28 monitors the contract state of the battery 14, by referring to the usage contract DB 62 while measuring the date and time, such that the number of batteries 14 to be used, i.e., the number of batteries to be rented to the user U that has made the usage contract, is equal to or less than the number of batteries 14 in each battery station 22.

The business operator issues the IC card 32 by writing the user ID stored in the business operator terminal 26 into the IC card 32 via the writer 34. The sharing system 12 is not limited to storing the user ID in the IC card 32, but may be configured to store the user ID in the user terminal (not shown) or the like possessed by the user U. The user terminal includes a communication module capable of communicating with the reader 44 of the battery station 22. When the user terminal is brought close to the reader 44 by the user U, the user terminal transmits the user ID and the like to the rental control unit 38.

Figure 2:
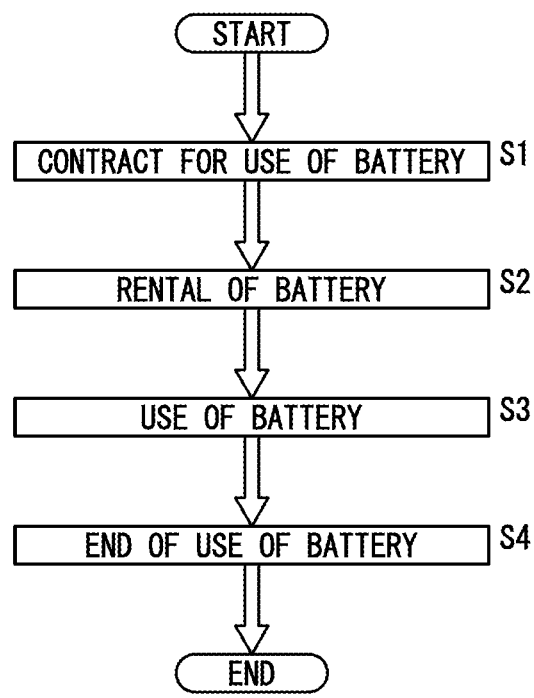
FIG. 2 is a flowchart showing a procedure for using a sharing system.

After the usage contract has been made, the user U rents the battery 14 from the battery station 22 during the usage contract period (step S2 in FIG. 2). At this time, the rental control unit 38 of the battery station 22 and the management server 28 rent the battery 14 to the user U by performing information communication with each other while performing appropriate processing.

For example, the user U performs an operation for rental of the battery 14 through the touch panel 42 of the battery station 22, and holds the IC card 32 over the reader 44 to input the user ID. When recognizing the rental operation and the user ID, the rental control unit 38 transmits the user ID and a rental request information indicating a request by the user U for renting the battery, to the management server 28.

Based on reception of the rental request information and the user ID, the management server 28 retrieves the use condition of the user U registered in the usage contract DB 62. Then, the management server 28 determines whether or not the current date and time falls within the period between the contract start date and time and the contract end date and time of the retrieved use condition. Further, the management server compares the number of batteries 14 currently rented to the user U with the number of batteries to be used, specified in the use condition. Thus, when the management server 28 determines that the user U is allowed to rent the battery 14, the management server 28 transmits a rental permission command to the battery station 22. The management server 28 transmits a rental non-permission command to the battery station 22 in a case that: the user U is not under the usage contract; the timing of the rental request does not coincide with the usage contract period; the number of batteries specified in the contract has already been rented; or the like.

When the rental control unit 38 of the battery station 22 receives and stores the rental permission command, the rental control unit checks the remaining battery levels of the accommodated batteries 14 and selects batteries 14 having a sufficient remaining battery level, in accordance with the number of batteries to be used. The rental control unit 38 unlocks the battery lock mechanism 46 that puts the selected battery 14 into an unremovable state, and notifies the user U of the position of the unlocked battery 14. Thus, the user U rents the battery 14 by taking the unlocked battery 14.

When the battery 14 is rented to the user U, the rental control unit 38 transmits rental information such as the battery ID of the battery 14, its rental date and time (checkout date and time), etc., to the management server 28. The management server 28 uses the rental information to determine whether the battery 14 is in an idle state, which will be described later.

During use of the battery 14 (step S3 in FIG. 2), when the remaining battery level of the battery 14 becomes low, the user U puts (returns) the battery 14 into the battery station 22. The rental control unit 38 automatically charges the battery 14 by acquiring the remaining battery level and the like from the battery 14 accommodated in the slot 36. Furthermore, the rental control unit 38 identifies the returned battery 14 by acquiring the battery ID when the battery 14 is returned, and transmits return information such as the battery ID of the battery 14, its return date and time, etc., to the management server 28. The management server 28 also uses this return information to determine whether the battery 14 is in the idle state.

At the end of use of the battery 14 (step S4 in FIG. 2), the user U performs a use end operation of the battery 14 through the touch panel 42 of the battery station 22, and reads the user ID of the IC card 32 through the reader 44. Thereby, the rental control unit 38 transmits the use end information and the user ID of the user U to the management server 28, and the management server 28 sends back to the rental control unit 38 the battery ID of the battery rented to the user U, based on the user ID. When the rental control unit 38 checks the battery ID acquired from the accommodated battery 14 against the battery ID received from the management server 28. Upon determining that the IDs match each other, the process of ending the use of the battery 14 by the user U is completed.

Figure 4:
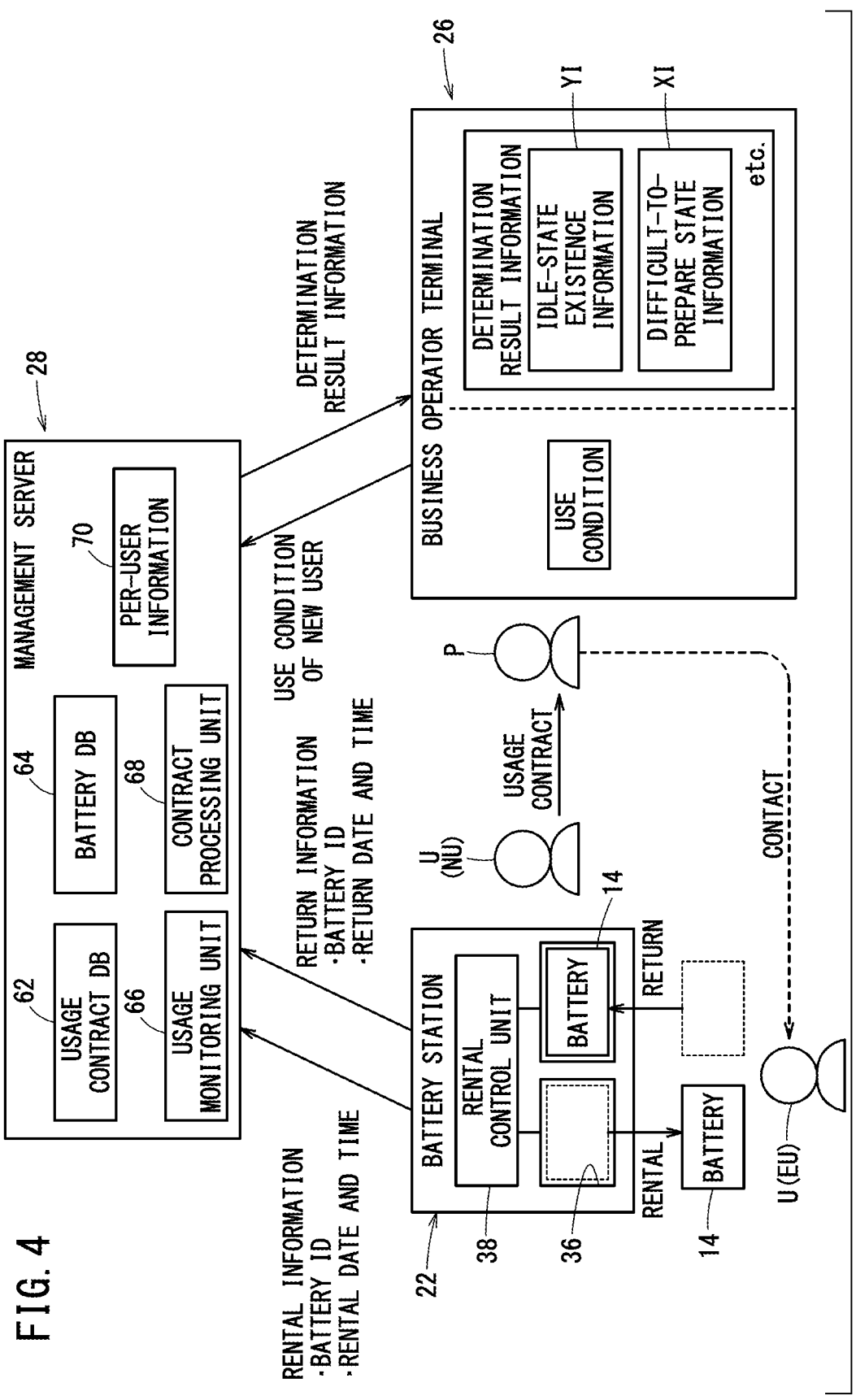
FIG. 4 is a block diagram illustrating a battery rental and return process.

Next, monitoring of the battery 14 by the management server 28 of the sharing system 12 will be described with reference to FIG. 4. The management server 28 of the sharing system 12 performs information communication with the battery station 22 and monitors the status of use of the battery 14 by the user U. At this time, the management server 28 determines whether or not the battery 14 is in the idle state, based on the rental information and the return information.

The idle state of the battery 14 refers to a state in which the user U does not use the battery 14 (i.e., leaving the battery as it is) while the user U rents the battery 14 from the battery station 22. Alternatively, the idle state of the battery 14 refers to a state in which the battery 14 returned by the user U remains not rented from the battery station 22. The sharing system 12 has a limited number of batteries 14 to be rented to each user U. For this reason, if a situation occurs in which there are not enough batteries 14 to be rented to a user U who has newly made the usage contract, during the usage contract period of that user U, whereas other users U leave some rented batteries 14 idle, then it can be said that the utilization efficiency of the batteries 14 is decreased. Therefore, the sharing system 12 is configured such that the management server 28 determines whether or not the battery 14 is in the idle state and recognizes (stores) the battery 14 that is in the idle state.

More specifically, the management server 28 includes a battery database 64 (hereinafter referred to as a battery DB 64) that stores rental information and return information for each of the plurality of batteries 14 provided in the sharing system 12. In addition, the management server 28 includes a usage monitoring unit 66 that monitors the status of use of the battery 14 by the user U, and a contract processing unit 68 that compares and processes usage contracts of a plurality of the users U.

As shown in FIG. 5A, the battery DB 64 stores therein the battery ID, the code (or current position) of the battery station 22 to which it belongs, the rental state such as Rented Out/Not Rented, the rental date and time, the return date and time, the user ID of the user U having the rented battery, the usage contract period (contract start date and time, contract end date and time) of the user U, and the like. Here, the "Rented Out" of the rental state refers to a state in which the battery 14 is taken out from the battery station 22 and rented to the user U. On the other hand, the rental state "Not Rented" means a state in which the battery 14 is not taken out from the battery station 22 (has already been returned).

The usage monitoring unit 66 of the management server 28 monitors the status of use of the battery 14 for each of the plurality of users U who are under the usage contract, based on the reception of the rental information (the battery ID, the rental date and time, and the like) and the return information (the battery ID, the return date and time, and the like) from the battery station 22. For example, the usage monitoring unit 66 extracts information on the usage contract of the user U from the usage contract DB 62 and information on each battery 14 from the battery DB 64, and generates information on the battery 14 that is in use, for each user U (hereinafter referred to as per-user information 70). Then, the usage monitoring unit 66 updates the per-user information 70 as needed, based on the rental information and the return information that are received from the battery station 22.

As shown in FIG. 5B, the per-user information 70 includes the battery ID, the rental state such as Rented Out and Not Rented, a current elapsed period of time, a past record of period for rented state, a past record of period for not-rented state, an idle determination result, an early termination determination result, and the like. In a case where the battery 14 is rented to the user U, the current elapsed period of time corresponds to the time or the number of days that has elapsed from the rental date and time to the current point in time (FIG. 5B adopts the number of days as units), and will be hereinafter also referred to as a current rental elapsed period Nr. In addition, in a case where the user U returns the battery 14, the current elapsed period of time corresponds to the time or the number of days that has elapsed from the return date and time to the current point in time (FIG. 5B adopts the number of days as units), and will be hereinafter also referred to as a current non-rental elapsed period Ns.

The past record of period for rented state is a past record of an elapsed period of time elapsing from when the user U rents the battery 14 to when the user U returns the battery 14, and will be hereinafter denoted by a symbol Pr. For example, when a cycle from rental to return of the battery 14 is performed once, the elapsed period of time from the rental to the return in the one cycle is stored. When the cycle from rental to return of the battery 14 is performed twice or more, the average value of the elapsed period of time concerning all the cycles from rental to return is stored. Similarly, the past record of period for not-rented state is a past record of an elapsed period of time elapsing from when the user U returns the battery 14 to when the user U rents the battery 14 again, and will be hereinafter denoted by a symbol Ps. For example, when a cycle from return to rental of the battery 14 is performed once, the elapsed period of time from the return to the rental in the one cycle is stored. When the cycle from return to rental of the battery 14 is performed twice or more, the average value of the elapsed period of time concerning all the cycles from return to rental is stored.

It is a matter of course that an appropriate calculation method may be adopted for the past record of period for rented state Pr and the past record of period for not-rented state Ps. For example, in the battery station 22, when the rental state switches from the return state to the rented state in a short time by replacing the battery 14 in use with another battery 14 or the like, the switching time may not be included in the parameters for calculating the past record of period for not-rented state Ps. Similarly, when the battery 14 is returned in a short time after having been taken out from the battery station 22, the short time may not be included in the parameters for calculating the past record of period for rented state Pr. In this way, when the user U has performed an irregular action in the rental or return operation, the time taken to perform the action is omitted, whereby the average value or the like can be calculated with higher accuracy.

Figure 6:
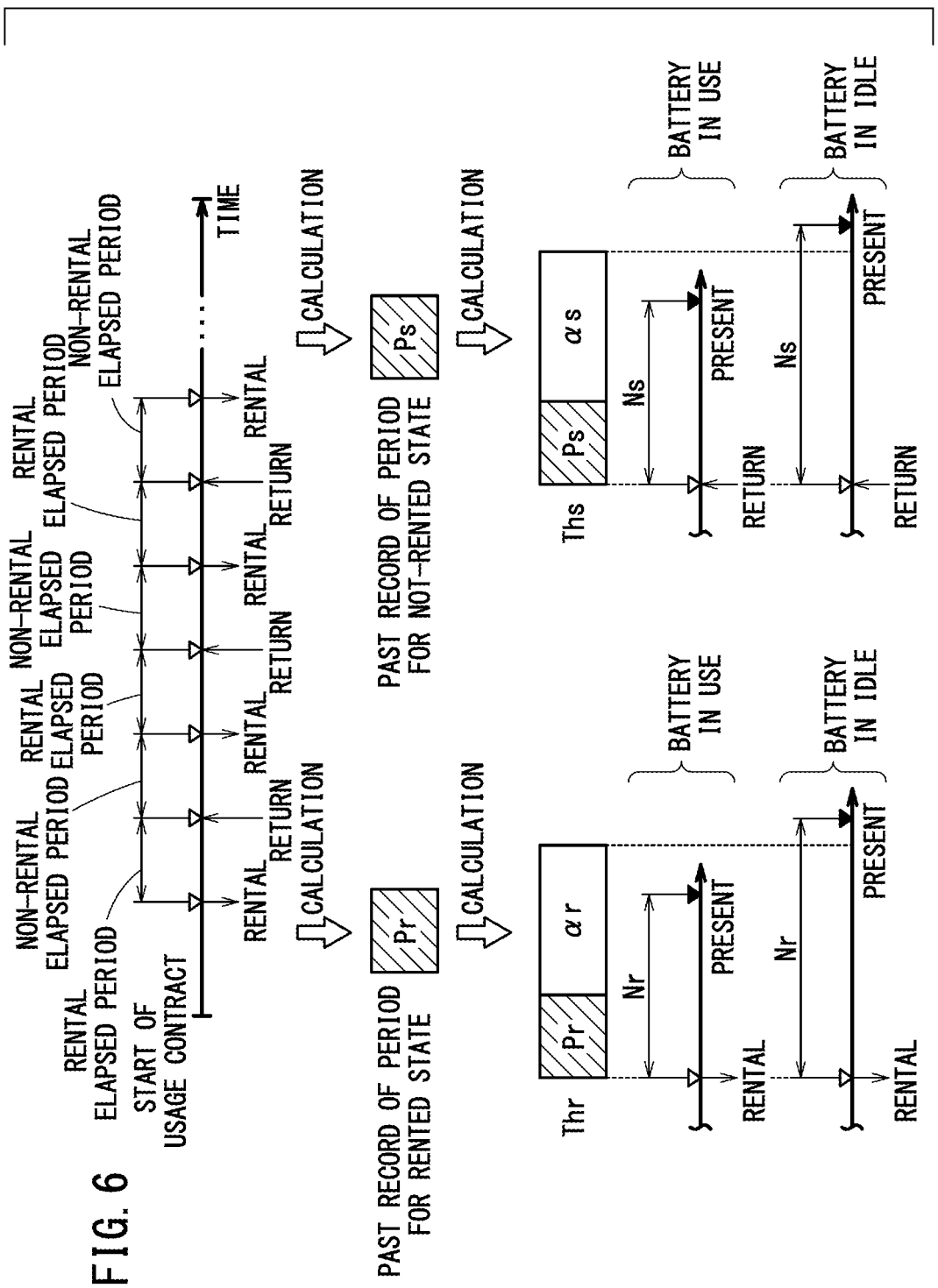
FIG. 6 is an explanatory diagram illustrating an example of a process of determining the idle state of the battery.

The usage monitoring unit 66 determines whether the battery 14 is in the idle state, and then the idle determination result J of the per-user information 70 stores the determination result. Next, determination of the idle state of the battery 14 by the usage monitoring unit 66 will be described in detail with reference to FIG. 6.

Here, a situation is assumed in which, when the battery 14 is on loan to the user U, the user U does not temporarily return the battery 14 to the battery station 22 in order to charge the battery 14, even after a certain period of time has elapsed. Normally, in this situation, the remaining battery level of the battery 14 is reduced to zero or near zero, and thus the battery 14 must be charged. Nevertheless, when the user U does not return the battery 14 to the battery station 22, it can be regarded that the battery 14 is not used, that is, the battery 14 is in the idle state.

Therefore, when the rental state of the battery 14 is "Rented Out", the usage monitoring unit 66 extracts the past record of period for rented state Pr from the per-user information 70, and calculates the determination rental period Thr (predetermined time period) for determining the idle state of the battery 14. The determination rental period Thr can be calculated by various calculation methods.

As an example, the determination rental period Thr is calculated by adding a predetermined rental allowance period $\alpha r$ to the past record of period for rented state Pr (Thr=Pr+$\alpha r$). The rental allowance period $\alpha r$ is not particularly limited. The rental allowance period is set to, for example, one day, two days, etc., when the determination rental period Thr is expressed in days, or set to 24 hours, 48 hours, etc., when the determination rental period Thr is expressed in hours. As another example, the determination rental period Thr is calculated by multiplying the past record of period for rented state Pr by a rental allowance coefficient $\beta r$ of 1 or more (Thr=Pr×$\beta r$). The rental allowance coefficient $\beta r$ is also not particularly limited, and may be set in a range of about 1.5 to 5, for example. The determination rental period Thr may be set to a predetermined value (for example, three days, one week, or the like) that does not depend on the past record of period for rented state Pr.

The usage monitoring unit 66 measures time, and routinely monitors whether or not the current rental elapsed period Nr has reached the calculated determination rental period Thr. In a case that the current rental elapsed period Nr is shorter than the determination rental period Thr, it is estimated that the battery 14 is in a state of being used, whereas in a case that the current rental elapsed period Nr reaches the determination rental period Thr or more, it is estimated that the battery 14 is in the idle state in which the battery 14 is not used. When the idle state is estimated while the battery 14 is on loan to a user, the usage monitoring unit 66 stores the code indicating the idle state, in the column of the idle determination result J of the per-user information 70 (see FIG. 5B). Even if the idle state is determined once, the usage monitoring unit 66 cancels the determination result indicating the idle state, when the battery 14 is returned. This allows the management server 28 to easily reflect the fact that there has been a change in the use of the battery 14, into the information.

Conversely, a situation is assumed in which the user U does not rent the battery 14 even after a certain amount of time has elapsed since the user U returned the battery 14 to the battery station 22. That is, the user U does not come to rent the battery 14 from the battery station 22 in spite of the situation where the user U is allowed to rent the battery 14. This can be regarded that there is no need to use the battery 14, that is, the battery 14 is in the idle state.

Therefore, when the rental state of the battery 14 is "Not Rented", the usage monitoring unit 66 extracts the past record of period for not-rented state Ps from the per-user information 70, and calculates the determination non-rental period Ths (predetermined time period) for determining the idle state of the battery 14. The determination non-rental period Ths can also be calculated by various calculation methods.

As an example, the determination non-rental period Ths is calculated by adding a predetermined non-rental allowance period as to the past record of period for not-rented state Ps (Ths=Ps+αs). The non-rental allowance period αs is set to one day, two days, or the like or 24 hours, 48 hours, or the like, in the same manner as described above. This non-rental allowance period αs may be the same as or different from the rental allowance period αr of the determination rental period Thr. As another example, the determination non-rental period Ths is calculated by multiplying the past record of period for not-rented state Ps by a non-rental allowance coefficient βs of 1 or more (Ths=Ps×(βs). The non-rental allowance coefficient βs is also not particularly limited, may be set in a range of about 1.5 to 5, for example, and may be the same as or different from the rental allowance coefficient βr of the determination rental period Thr. Note that the determination non-rental period Ths may also be set to a predetermined value (for example, three days, one week, or the like) that does not depend on the past record of period for not-rented state Ps.

The usage monitoring unit 66 measures time and routinely monitors whether or not the current non-rental elapsed period Ns has reached the calculated determination non-rental period Ths. When the current non-rental elapsed period Ns is shorter than the determination non-rental period Ths, it is estimated that the battery 14 is in a state of being used, whereas when the current non-rental elapsed period Ns is equal to or longer than the determination non-rental period Ths, it is estimated that the battery 14 is in the idle state of not being used. When the idle state is estimated while the battery 14 is not rented to a user, the usage monitoring unit 66 stores the code indicating the idle state, in the column of the idle determination result J of the per-user information 70 (see FIG. 5B). Even if the idle state is determined once, the usage monitoring unit 66 cancels the determination result indicating the idle state, when the battery 14 is rented.

In addition, the usage monitoring unit 66 monitors the idle state of each battery 14 with respect to the number of batteries 14 to be used, specified in the contract made by the user U, thereby enabling a follow-up check on whether batteries 14 of the same user U are in the idle state.

As described above, the management server 28 determines (estimates) and stores the idle state of the battery 14 of the user U who has made the usage contract. Thus, for example, the person in charge P at the business operator can access the management server 28 via the business operator terminal 26 to check the idle state of the battery 14. Accordingly, the person in charge P can propose shortening of the contract end date and time of the battery 14, to the user U having the rented battery 14 that is in the idle state. Since the idle state of the battery 14 depends on the use situation of the user U and the intention of the user U, even when confirming that the battery 14 is in the idle state, the business operator side may leave the battery in the idle state without taking any action.

Referring back to FIG. 4, in the sharing system 12, in a state where there is a user U (hereinafter referred to as an existing user (i.e., an already-contracted user EU)) who has made the usage contract to use the battery 14, a new person interested in the contract to use the battery (hereinafter referred to as a new user NU) makes a usage contract to use the battery 14. At this time, the management server 28 receives the user ID of the new user NU and the use condition (contract start date and time, contract end date and time, the number of batteries to be used, and the like) from the business operator terminal 26.

Upon receiving the use condition of the new user NU, the contract processing unit 68 of the management server 28 refers to the usage contract DB 62 and the battery DB 64 to check the usage status of the batteries 14 according to the contract start date and time, the contract end date and time, and the number of batteries to be used, of the new user NU. The contract processing unit 68 transmits information indicating that the contract is OK, to the business operator terminal 26, when rentable batteries 14 can be prepared in accordance with the usage contract scheduled period (contract start date and time, contract end date and time) and the number of batteries to be used, of the new user NU. Accordingly, the person in charge P can proceed with making a contract for using the battery 14 with the new user NU.

On the other hand, when there is no battery 14 that can be rented to the new user NU, the contract processing unit 68 reads the per-user information 70 and determines whether or not the existing user EU has a rented battery 14 that is in the idle state (hereinafter, referred to as idle battery extraction determination). When the idle battery extraction determination determines that there is no rented battery 14 that is in the idle state, difficult-to-prepare state information XI (determination result information) indicating that it is difficult to prepare the batteries 14 under the transmitted use condition is notified to the business operator terminal 26. Accordingly, the person in charge P can inform the new user NU that it is difficult to rent the batteries 14 under the current use condition. The management server 28 may add the contract end date and time of the existing user EU to the difficultto-prepare state information XI, and thus the person in charge P can also prompt the new user NU to change the use condition of the battery 14.

On the other hand, in the idle battery extraction determination, when there is an existing user EU having a rented battery 14 that is in the idle state, as shown in FIG. 7A, the contract processing unit 68 calculates the remaining period ST from the current time point to the contract end date and time, of the existing user EU. Then, the contract processing unit 68 determines whether or not the calculated remaining period ST of the existing user EU is equal to or less than a threshold value (hereinafter, referred to as period determination), wherein the usage contract scheduled period NT (i.e., a period from the contract start date and time to the contract end date and time) of the new user NU is used as the threshold value. That is, when the remaining period ST of the existing user EU is longer than the usage contract scheduled period NT of the new user NU, it can be said that it is preferable for the business operator to give priority to the usage contract of the existing user EU. Therefore, when the remaining period ST of the existing user EU is longer than the threshold value, the contract processing unit 68 notifies the business operator terminal 26 of the difficult-to-prepare state information XI (determination result information).

The threshold value for determining the remaining period ST of the existing user EU is not limited to the use of the usage contract scheduled period NT of the new user NU as it is. For example, the threshold value may be a value obtained by adding a predetermined length of time (one day, one week, etc.) to the usage contract scheduled period NT. As a result, the existing user EU having the rented battery 14 that is in the idle state is easily extracted, and the battery 14 in the idle state can be efficiently utilized. Alternatively, the threshold may be a value obtained by subtracting a predetermined length of time (one day, one week, etc.) from the usage contract scheduled period NT.

On the other hand, as shown in FIG. 7B, when the remaining period ST of the existing user EU is equal to or shorter than the usage contract scheduled period NT of the new user NU, it can be said that it is preferable for the business operator to give priority to the usage contract of the new user NU. Therefore, when the remaining period ST of the existing user EU is equal to or less than the threshold value, the contract processing unit 68 stores a code indicating an early termination target, in the column of the early termination determination result E associated with the battery 14 that is in the idle state, in the per-user information 70 (see FIG. 5B). The early termination target is stored for each battery 14 of the existing user EU. Accordingly, it is possible to grasp that the existing user EU leaves some of the batteries 14 idle, among the plurality of batteries 14 to be used, and to prompt the existing user to early terminate use of those idle batteries 14.

Then, based on the early termination target in the early termination determination result E, the contract processing unit 68 generates idle-state existence information YI (determination result information) indicating that there is a battery 14 that is in the idle state, and notifies the business operator terminal 26 of the idle-state existence information YI. The idle-state existence information YI includes a contact information of the existing user EU having the battery 14 that is in the idle state. As a result, the person in charge P who has confirmed the idle-state existence information YI in the output device 26a of the business operator terminal 26 can contact the existing user EU and propose an early termination of the usage contract. In a case that the existing user EU accepts the proposal for the early termination of the usage contract, it is possible to make the usage contract with the new user NU by changing the contract termination date and time of the existing user EU.

The existing user EU that accepts the proposal for the early termination is given an incentive (discount, points, or the like) accompanying the shortening of the usage contract period. The management server 28 may calculate an incentive in accordance with the remaining period ST of the existing user EU and add the calculated incentive to the idle-state existence information YI. Thus, the existing user EU can be caused to easily accept the early termination of the usage contract.

Further, as shown in FIG. 7C, when there are a plurality of existing users EU (for example, existing users EU1, EU2, . . . ) each having the rented battery 14 that is in the idle state, the contract processing unit 68 calculates the remaining period ST (remaining periods ST1, ST2, . . . ) of each existing user EU. Then, when there are a plurality of existing users EU having the remaining period ST equal to or shorter than the usage contract scheduled period NT (threshold value) of the new user NU, the contract processing unit 68 selects the existing user EU having the shorter remaining period ST. For example, in FIG. 7C, the contract processing unit 68 preferentially generates the idle-state existence information YI (determination result information) of the existing user EU2 by selecting the existing user EU2 whose remaining period ST2 is short and writing the early termination target in only the column of the early termination determination result E of the per-user information 70. As a result, the person in charge P can preferentially propose an early termination for the usage contract of the existing user EU2 whose remaining period ST2 is short. In a case where there are a plurality of existing users EU each having the battery 14 that is in the idle state, the idle-state existence information YI may include information on the plurality of existing users EU in association with priority order in which priorities are set in ascending order of the remaining period ST.

Figure 8:
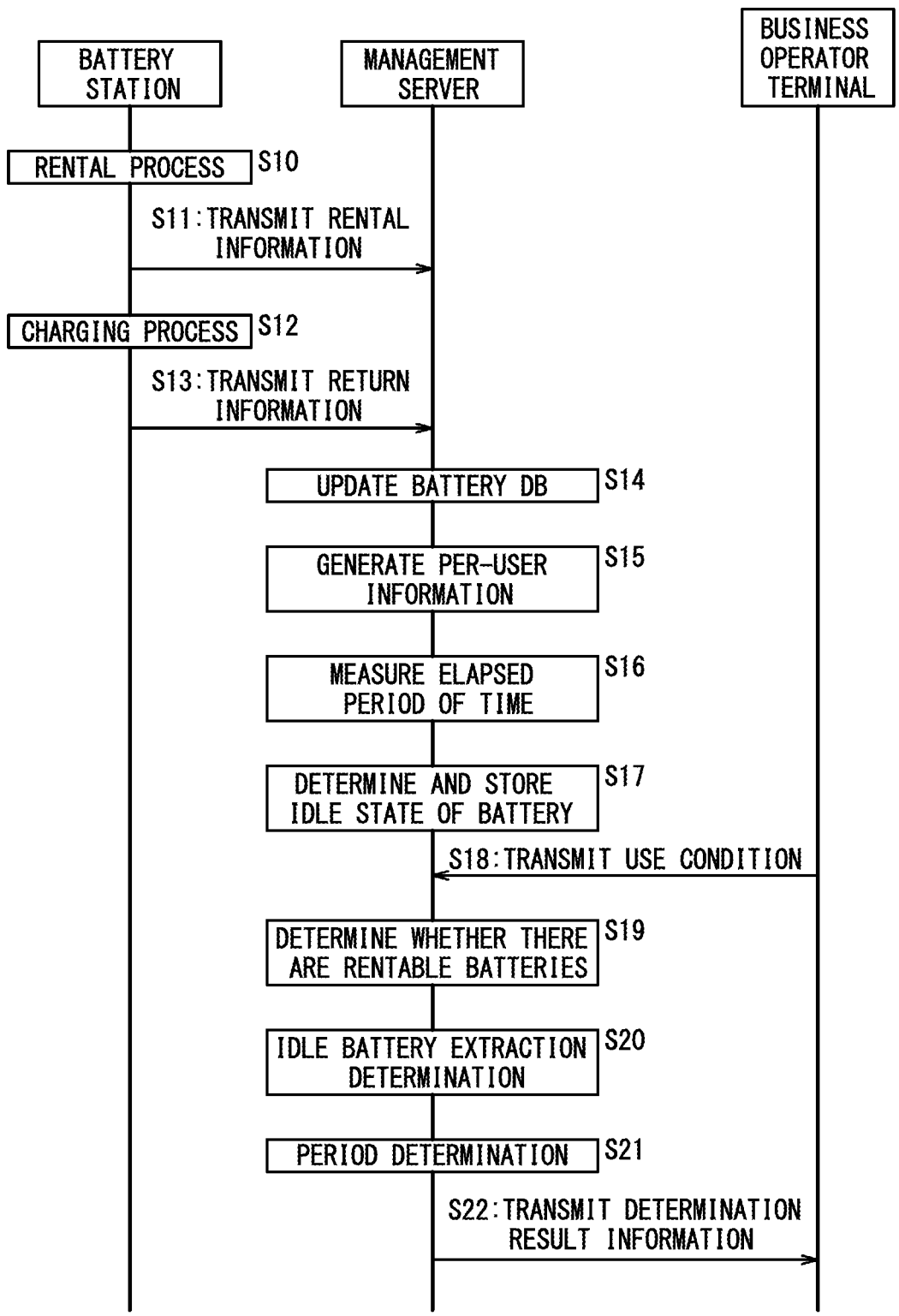
FIG. 8 is a flowchart illustrating a process flow of a battery station, a management server, and a business operator terminal when whether the battery is in an idle state is determined.

Hereinafter, an example of a process flow of the sharing system 12 (management system 10) will be described with reference to FIG. 8.

The rental control unit 38 of the battery station 22 performs a rental process for renting the battery 14 to the existing user EU (step S10). At this time, the rental control unit 38 acquires the battery ID and the rental date and time, and transmits rental information including the battery ID and the rental date and time to the management server 28 (step S11).

Further, the rental control unit 38 performs a charging process when the existing user EU returns the battery 14 (step S12). At this time, the rental control unit 38 acquires the battery ID and the return date and time, and transmits return information including the battery ID and the return date and time to the management server 28 (step S13).

The management server 28 (usage monitoring unit 66) updates the battery DB 64 based on the rental information and the return information transmitted from the battery station 22 (step S14). Further, the management server 28 generates the per-user information 70 for each existing user EU, based on the rental information, the return information, the usage contract DB 62, and the battery DB 64 (step S15).

The management server 28 measures the current elapsed period of time in accordance with the battery ID and the rental state (step S16), and periodically updates the past record of period for rented state Pr, the past record of period for not-rented state Ps, and the like, in the per-user information 70. Then, the management server 28 determines whether the battery 14 is in the idle state, based on the current elapsed period of time, the past record of period for rented state Pr, and the past record of period for not-rented state Ps, and stores the determination result in the per-user information 70 (step S17).

In addition, in the sharing system 12, when the new user NU makes a usage contract for using the battery 14, the use condition is transmitted from the business operator terminal 26 to the management server 28 under the operation of the person in charge P (step S18). When the management server 28 (contract processing unit 68) receives the use condition, the management server 28 determines whether or not there are rentable batteries 14 corresponding to the use condition (step S19), and if there are rentable batteries 14, the management server 28 transmits determination result information indicating that there are rentable batteries 14, to the business operator terminal 26.

When there are no rentable batteries 14, the management server 28 reads the per-user information 70 and performs the idle battery extraction determination (step S20). When the idle battery extraction determination determines that there are batteries 14 that are in the idle state, the period determination is performed based on the remaining period ST of the existing user EU and the usage contract scheduled period NT of the new user NU (step S21). Then, the management server 28 transmits the determination result information (the idle-state existence information YI or the difficult-to-prepare state information X1) of the period determination, to the business operator terminal 26 (step S22).

Accordingly, the person in charge P who has confirmed the determination result information of the business operator terminal 26 can take appropriate measures such as contacting the existing user EU to propose an early termination of the usage contract or requesting the new user NU to change the usage contract scheduled period NT. For example, when the existing user EU accepts the early termination, the business operator can smoothly make the usage contract with the new user NU.

The present invention is not limited to the above-described embodiments, and various modifications can be made within the scope of the invention. The sharing system 12 (management system 10) may be configured to make a usage contract for use of the battery 14 by accessing the management server 28 from a user terminal owned by the user U. That is, the management system 10 may have a configuration not including the business operator terminal 26.

In addition, the management system 10 may have a configuration in which a charger (not illustrated) owned or rented by the user U is communicably connected to the management server 28 without going through the battery station 22. In this case, the charger has the same function as the above-described rental control unit 38 including a computer having one or more processors, a memory, and an input/output interface. When the user U takes out the battery 14 from the charger, the charger transmits rental information including a battery ID and a rental date and time (taking-out date and time), to the management server 28. When the user U loads the battery 14 into the charger, the charger transmits return information including a battery ID and a return date and time (accommodation date and time), to the management server 28. Accordingly, the management server 28 can monitor the status of use of the battery 14 of the user U and determine whether the battery 14 is in the idle state. In other words, the accommodation device of the present invention is not limited to the battery station 22 having both the charger for charging the battery 14 and the exchanger through which a battery 14 can be replaced with another battery 14. As the accommodation device, the above-described charger may be applied, or the exchanger which does not have a charging function and performs only exchange between batteries 14 may be applied.

A description will be given below concerning the technical concepts and advantageous effects capable of being grasped from the above-described embodiments.

An aspect of the present invention is characterized by the management system 10 including the management server 28 configured to perform information communication with the accommodation device (battery station 22) configured to accommodate the battery 14 to be rented based on the usage contract, wherein the management server 28 is configured to: acquire the rental date and time at which the battery 14 was rented from the accommodation device and the return date and time at which the battery 14 was returned to the accommodation device, during the usage contract period of the existing user EU who has made the usage contract for use of the battery 14; and determine that the battery 14 is in the idle state in the case that the predetermined time period has elapsed since the rental date and time without the battery 14 being returned or in the case that the predetermined time period has elapsed since the return date and time without the battery 14 being rented.

With the above configuration, the management system 10 can estimate the idle state of the battery 14 by acquiring the rental date and time and the return date and time during the usage contract period of the battery 14 of the existing user EU. As a result, the business operator who has confirmed that the battery 14 is in the idle state can propose an early termination of the usage contract to the existing user EU. When the existing user EU accepts the proposal for the early termination of the usage contract for the battery 14, the battery 14 can be rented to another user U (a person that wishes to make a new usage contract). Therefore, the management system 10 can utilize the battery 14 more efficiently.

The management server 28 is configured to: determine whether or not the remaining period ST before the end of the usage contract period is less than or equal to the threshold value, concerning the battery 14 that is in the idle state; and notify the terminal (business operator terminal 26) connected to the management server 28 of idle-state existence information YI indicating existence of the battery 14 that is in the idle state, in the case that the remaining period ST is equal to or less than the threshold value. Accordingly, the person in charge P on the business operator side that has received the idle-state existence information YI can consider utilization of the battery 14 that is in the idle state.

When the remaining period ST is longer than the threshold value, the management server 28 notifies the terminal of information indicating that it is difficult to prepare the battery 14. When the remaining period ST is long, there is a possibility that the user U may use again the battery 14 that is in the idle state. Therefore, it is possible to prevent the user U from experiencing annoyingness caused by the proposal of the early termination of the usage contract for use of the battery 14.

The threshold value for determining the remaining period ST of the existing user EU is the usage contract scheduled period NT of a person that wishes to make a new usage contract (new user NU). Thus, the management system 10 compares the remaining period ST of the existing user EU with the usage contract scheduled period NT of the person that wishes to make the new usage contract, thereby easily calculating the difference in benefit depending on the usage contract scheduled period NT.

Further, the management server 28 adds the contact information of the existing user EU to the idle-state existence information YI. Accordingly, the person in charge P on the business operator side that has received the notification of the idle-state existence information YI can easily contact the existing user EU having the battery 14 that is in the idle state.

In addition, in the case that there are a plurality of the existing users EU that have the remaining period ST equal to or less than the threshold value, the management server 28 preferentially selects, from the plurality of existing users EU, the existing user EU whose remaining period ST is shortest among the plurality of existing users EU and notifies the terminal (business operator terminal 26) of the idle-state existence information YI concerning the existing user EU that has been preferentially selected. As a result, the management server 28 can specify the user U that can cause more benefit depending on the usage contract scheduled period NT.

Further, the predetermined time period relating to the rental date and time is set based on the past record of the period for the rented state concerning the existing user, the period for the rented state being a period elapsing from when the existing user EU rents the battery 14 to when the existing user EU returns the battery 14, and the predetermined time period relating to the return date and time is set based on the past record of a period for a non-rented state concerning the existing user, the period for the non-rented state being a period elapsing from when the existing user EU returns the battery 14 to when the existing user EU rents the battery 14. Accordingly, the management system 10 can appropriately determine the idle state of the battery 14, in accordance with the past trend of the user U.

Further, the predetermined time period relating to the rental date and time is calculated by adding the rental allowance period αr to the past record of the period for the rented state (past record of period for rented state Pr) or multiplying the past record of the period for the rented state by the rental allowance coefficient (βr). The predetermined time period relating to the return date and time is calculated by adding the non-rental allowance period (αs) to the past record of the period for the non-rented state (past record of period for not-rented state Ps) or multiplying the past record of the period for the non-rented state by the non-rental allowance coefficient (βs). As a result, the management system 10 can improve the accuracy with which the idle state of the battery 14 is determined.

The invention claimed is:

1. A management system comprising a management server and an accommodation device configured to accommodate a plurality of batteries to be rented based on a usage contract,
  wherein the management server is configured to perform information communication with the accommodation device,
  wherein the accommodation device includes a computer configured to acquire rental information including a rental date and a time at which the battery was rented, and a return date and time at which the battery was returned to the accommodation device, during a usage contract period of an existing user who has made the usage contract for use of the battery,
  wherein the accommodation device further includes a plurality of slots each configured to accommodate one of the plurality of batteries, each of the plurality of slots including a communication module that performs communication between the one of the plurality of batteries accommodated therein and the computer of the accommodation device so that the computer of the accommodation device acquires battery identification information of the one of the plurality of batteries accommodated therein,
  wherein the management server is configured to:
    perform the information communication with the accommodation device to acquire the rental information and the battery identification information from the accommodation device by receiving a signal indicating the rental information and the battery identification information from the accommodation device;
    determine that a battery of the plurality of batteries is in an idle state in a first case or a second case based on the acquired rental information, the first case being that a predetermined time period has elapsed since the rental date and time without the battery being returned and the second case being that a predetermined time period has elapsed since the return date and time without the battery being rented;
    determine whether or not a remaining period before end of the usage contract period is less than or equal to a threshold value, concerning the battery that is in the idle state; and
    notify a terminal connected to the management server of idle-state existence information indicating existence of the battery that is in the idle state, in a case that the remaining period is equal to or less than the threshold value.

2. The management system according to claim 1, wherein in a case that the remaining period is longer than the threshold value, the management server notifies the terminal of information indicating that it is difficult to prepare the battery.

3. The management system according to claim 1, wherein the threshold value for determining the remaining period of the existing user is set based on a usage contract scheduled period of a person that wishes to make a new usage contract for use of the battery.

4. The management system according to claim 3, wherein the management server adds contact information of the existing user to the idle-state existence information.

5. The management system according to claim 3, wherein in a case that there are a plurality of the existing users that have the remaining period equal to or less than the threshold value, the management server preferentially selects, from the plurality of existing users, an existing user whose remaining period is shortest of the remaining periods of the plurality of existing users and notifies the terminal of the idle-state existence information concerning the existing user that has been preferentially selected.

6. The management system according to claim 1, wherein the predetermined time period relating to the rental date and time is set based on a past record of a period for a rented state concerning the existing user, the period for the rented state being a period elapsing from when the existing user rents the battery to when the existing user returns the battery, and
the predetermined time period relating to the return date and time is set based on a past record of a period for a non-rented state concerning the existing user, the period for the non-rented state being a period elapsing from when the existing user returns the battery to when the existing user rents the battery.

7. The management system according to claim 6, wherein the predetermined time period relating to the rental date and time is calculated by adding a rental allowance period to the past record of the period for the rented state or multiplying the past record of the period for the rented state by a rental allowance coefficient, and the predetermined time period relating to the return date and time is calculated by adding a non-rental allowance period to the past record of the period for the non-rented state or multiplying the past record of the period for the non-rented state by a non-rental allowance coefficient.

\* \* \* \* \*